United States Patent Office 3,829,509
Patented Aug. 13, 1974

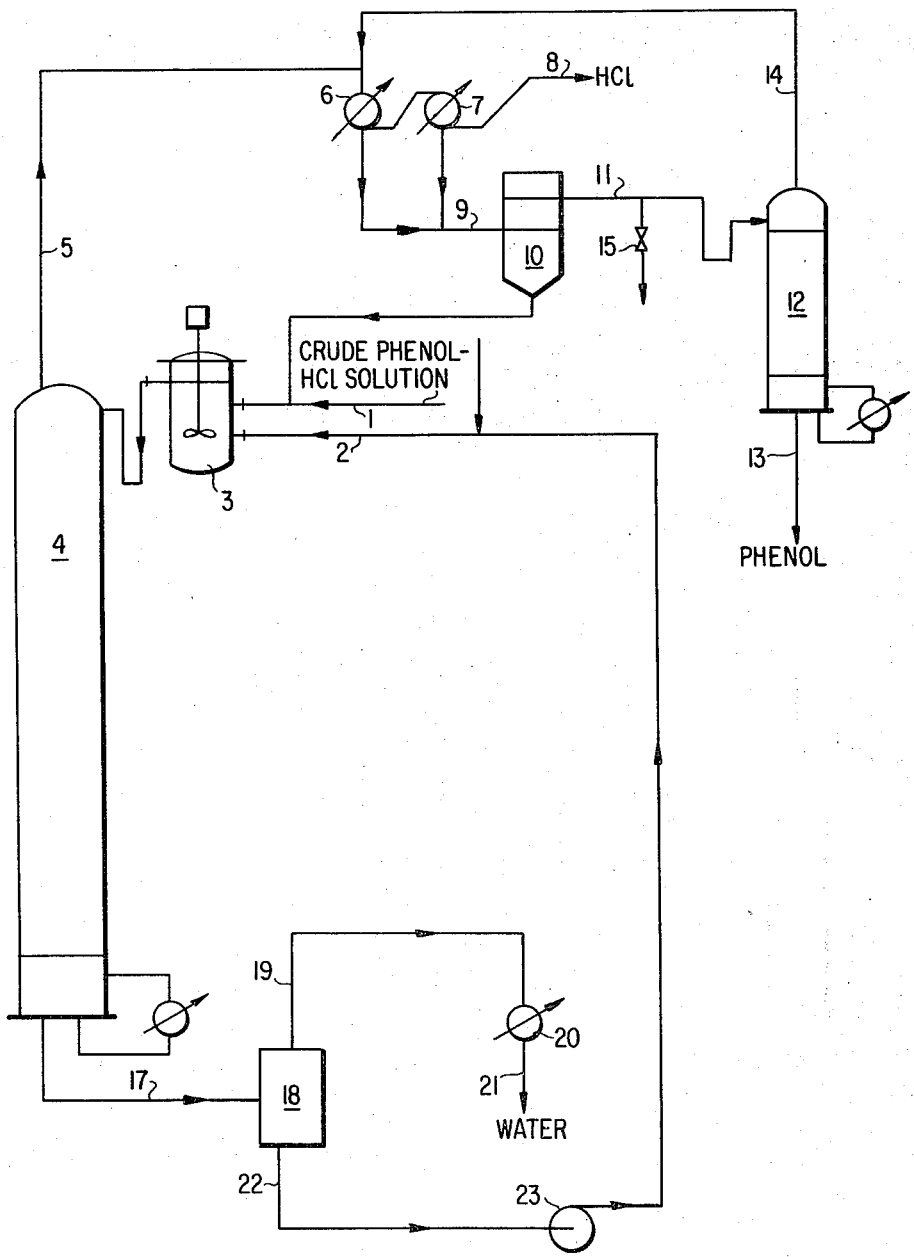

3,829,509
PROCESS FOR THE TREATMENT OF AQUEOUS SOLUTIONS OF PHENOL AND HYDROGEN CHLORIDE
Ernest Charles, Paris, Jean-Claude Leroi, Villeurbanne, and Michel Pech, Pont-de-Claix, France, assignors to Progil, Paris, France
Filed Nov. 24, 1969, Ser. No. 879,363
Claims priority, application France, Nov. 27, 1968, 50,684
Int. Cl. C07c 37/38
U.S. Cl. 260—621 A
3 Claims

ABSTRACT OF THE DISCLOSURE

A single stage separation of phenol and hydrogen chloride from a conjoint solution in water by distilling in the presence of calcium chloride or magnesium chloride so as to remove the hydrogen chloride and the phenol from the solution and cooling the resulting vapors to separate the hydrogen chloride in the gaseous state and the phenol in the liquid state.

---

The present invention relates to a process which makes it possible to separate, in a single stage, and to recover phenol and hydrogen chloride present conjointly in a solution in water.

It is known that in certain chemical synthesis during the treatment processes of the reaction mixtures, there is obtained an aqueous phase containing substantial amounts of phenol and of hydrogen chloride. This is, for example, the case when manufacturing diphenylolpropane starting from phenol and acetone in the presence of hydrogen chloride as the catalyst. The water present includes the water formed by reaction of the phenol and the acetone and possibly also the small amount introduced during the condensation. At the stage at which it is withdrawn, the aqueous phase contains the hydrogen chloride catalyst and a certain amount of unconverted phenol in the dissolved state.

The process usually carried out to separate this type of solution into its constituents comprises two successive stages which are firstly the removal of phenol and secondly, the separation of the hydrogen chloride. It is obvious that this system suffers from disadvantages because it requires the use of large equipment for carrying out these two separate operations.

A process has now been found which makes it possible simultaneously to remove the phenol and the hydrogen chloride from an aqueous solution. The process also permits the components of the solution to be collected in a state of high purity.

In its most general form, the process according to the present invention consists in submitting the acid-phenol solution to be treated, to a distillation in the presence of magnesium chloride or calcium chloride to remove the HCl and the phenol from the solution, and in cooling the resulting vapors so as to separate the hydrogen chloride in the gaseous state and the phenol in the liquid state.

Admittedly it is known to separate hydrogen chloride and water by distillation in the presence of metallic chlorides, especially calcium and magnesium chlorides. However, this process has apparently never been applied when phenol is also present and the scientific literature contains no information on this subject.

It is also known that water containing phenol and devoid of acid can be freed of the phenol present therein by distillation in the presence of metallic salts. Here however one is dealing with alkali salts, essentially sodium chloride and sodium carbonate. Furthermore, in order to be efficient, the distillation must be carried out under pressure or with steam being injected, and the remaining metallic salt solution still contains an amount of phenol of the order of 0.1%.

Contrasted to this, the process according to the present invention has the advantage of allowing easier distillation conditions to be employed and of leading to a solution of a metallic chloride which is practically devoid of phenol.

In the distillation according to the invention the minimum calcium chloride or magnesium chloride concentration is critical and must be in the order of 25% of the total weight of the reaction mass in the case of magnesium chloride and of 32% in the case of calcium chloride. Generally it is preferable to employ a slightly higher concentration than these figures. On the other hand there is no critical maximum threshold for the efficiency of the process; it is simply determined by the technological conditions of carrying out the process. The distillation is preferably carried out at atmospheric pressure because it is not necessary to apply a higher pressure to achieve optimum efficiency of the process.

The vapors issuing at the head during the distillation contain all the phenol and hydrogen chloride dissolved in the starting solution and a small proportion of water. They are partially condensed by cooling to a temperature which allows the phenol to be separated in the liquid form from the hydrogen chloride in the gaseous state. Given the composition of the vapor phase obtained, the mixture is cooled to a temperature which can be, for example, of the order of 20° to 25° C.

When cooled to a low temperature of about minus 20° C., the hydrogen chloride separated only carries small traces of water and phenol and can be used as such for numerous industrial uses. However, if one wishes to obtain a chemically pure acid, the acid can be purified according to the usual methods, for example, by passing over an absorbent, such as active charcoal, silica gel and the like. According to another possibility which is well known to those skilled in the art, the hydrogen chloride thus recovered can also be absorbed in water.

The liquid obtained by condensation of the head vapors separates into two layers. The lower layer consists of an aqueous solution of phenol and hydrogen chloride which can be returned to the distillation. The upper layer consists of the greater proportion of the phenol initially present in the acid-phenolic solution treated according to the invention. This phenol is saturated with hydrogen chloride and water: at ordinary temperature, for example, it contains about 10% by weight of HCl and 15% by weight of $H_2O$. When the process according to the invention is carried out for the treatment of phenolic waters withdrawn during the manufacture of diphenylolpropane, as stated above, or during any other synthesis using phenol in the presence of hydrogen chloride, the phenol saturated with hydrogen chloride and water which is collected by condensation according to the invention can be directly reused as such for these manufacturing processes. However, according to a variant, it is possible to recover the phenol in the pure state by subjecting the condensed phenolic layer to a distillation. The pure phenol is withdrawn at the foot of the column whilst the water and hydrogen chloride pass over at the head; these can be combined with the vapor phase formed during the first distillation.

The product remaining at the foot of the first distillation column consists of an aqueous solution of calcium chloride or magnesium chloride. This only contains small traces of hydrogen chloride; its phenol content is zero or very low, and does not exceed a few parts per million (p.p.m.). This solution can, for example, be treated in an evaporator in order to separate the water and the metallic salt. If one wishes to obtain water which is strictly free of phenol and hydrogen chloride impurities, the water vapor can, before condensation, be bubbled through a caustic alkali liquor, such as a sodium hydroxide solution.

In practice, a convenient means of carrying out the process according to the invention consists in introducing the calcium or magnesium salt in the form of an aqueous solution into the acid-phenolic water which is to be treated. The salt concentration of this solution is of course made such that the amount of calcium chloride or magnesium chloride present in the whole of the mass is not less than the values indicated above. The water to be purified and the aqueous solution of metallic chloride are first of all mixed and then introduced at the top of the distillation column. At the stage where the water is evaporated from the solution withdrawn at the foot of this column, it is possible only to separate the amount of water which corresponds to the amount of impure water treated and thus to obtain an aqueous solution of the metallic salt which is of the same concentration as that initially employed; this solution can be recycled to the distillation.

The process according to the present invention can be carried out discontinuously but it is advantageously and easily carried out continuously. It allows all of the water, of the phenol and of the hydrogen chloride present in the starting product to be recovered in the pure state. While this invention has been described with more especial reference to the aqueous phases withdrawn during the manufacture of diphenylolpropane it is obviously generally applicable to any type of aqueous solution of phenol and hydrogen chloride.

The examples which follow and are given without implying a limitation illustrate the results obtained according to the present invention.

EXAMPLE 1

This example was carried out in the installation which is schematically shown in the attached FIG. 1.

The installation comprises a pipe 1 for the introduction of the crude solution to be treated, an inlet 2 for the metallic chloride solution, a receptacle 3 provided with a stirrer for mixing the two solutions, and a distillation column 4; the top of the column 4 is connected by the pipe 5 to the condensers 6 and 7 from where the hydrogen chloride gas is passed through the tube 8 to the apparatus used for its subsequent treatment while the condensate enters the decanter 10 through pipe 9; the pipe 11 allows the upper layer coming from the decanter to be introduced into the column 12 for the purification of the phenol, from which the latter is withdrawn at 13; the top of the column 12 is connected by the pipe 14 to the condenser 6 for the passage of the $HCl-H_2O$ vapors; a pipeline 15 equipped with a valve allows a part of the unpurified phenol to be withdrawn if desired; the pipe 16 connects the bottom of the decanter to the feed pipe 1 for recycling the lower layer coming from the decanter. The bottom of the distillation column 4 is connected via pipe 17 to the evaporator 18; the pipe 19 allows the water vapor to pass into the condenser 20 from which water is withdrawn at 21. The bottom of the evaporator 18 is equipped with a pipe 22 through which the metallic chloride solution is withdrawn by the pump 23 and is recycled into the receptacle 3.

In this apparatus, the process was carried out continuously for 100 hours so as to treat 417 kg./hour of an aqueous solution containing 24% by weight of HCl and 5% by weight of phenol, using calcium chloride.

At equilibrium, the temperature in the boiler of column 4 was 124° C., that of the boiler of column 12 was 183° C. and that of the evaporator 18 was 130° C. The calcium chloride solution, the concentration of which was 53% by weight, entered the container 3 at the rate of 1433 kg./hour. The $CaCl_2$ solution entered the evaporator at a rate of 1743 kg./hour; its chloride concentration was 44% by weight, and it contained 1,600 p.p.m. of hydrogen chloride and 0.5 p.p.m. of phenol. One hundred kg./hour of gaseous hydrogen chloride were withdrawn through pipe 8, 20 kg./hour of pure phenol were withdrawn through pipe 13 and 310 liters/hour of water were withdrawn through pipe 21.

EXAMPLE 2

A continuous process was carried out for 100 hours in the same apparatus as described in Example 1, so as to treat 333 kg./hour of an aqueous solution containing 30% by weight of HCl and 5% by weight of phenol, using magnesium chloride.

At equilibrium, the temperature in the boiler of column 4 was 130° C., that of the boiler of column 12 was 183° C. and that of the evaporator was 135° C. The flow rate of the magnesium chloride solution into the receptable 3 was 1420 kg./hour with an $MgCl_2$ concentration of 45% by weight. The concentration of the solution entering the evaporator was 1636 kg./hour with a chloride concentration of 39%; this solution contained 1500 p.p.m. of hydrogen chloride and 3 p.p.m. of phenol. One hundred kg./hour of gaseous hydrogen chloride were withdrawn through pipe 8, 16.6 kg./hour of pure phenol were withdrawn through pipe 13, and 216 liters/hour of water were withdrawn through pipe 21.

What is claimed is:

1. A process for the single stage separation of phenol and hydrogen chloride present conjointly in solution in water which comprises distilling off said phenol and hydrogen chloride from said solution in the presence of at least 25% by weight of magnesium chloride or at least 32% by weight of calcium chloride calculated on the total weight of the mass, and cooling sufficiently the resulting distillation vapors so as to separate the hydrogen chloride in the gaseous state and phenol in the liquid state.

2. A process according to claim 1, wherein the metallic chloride is introduced in the form of an aqueous solution into the solution in water of phenol and hydrogen chloride which is to be treated.

3. A process according to claim 1, wherein the water from the metallic chloride solution remaining after the distillation is evaporated and then condensed.

References Cited

UNITED STATES PATENTS 2,906,789    9/1959    McNaughton ___ 260—621 A X
3,029,293    4/1962    Nixon _____ 260—621 A LEON ZITVER, Primary Examiner N. MORGANSTERN, Assistant Examiner U.S. Cl. X.R.

203—50; 260—619 A